(12) United States Patent
Song et al.

(10) Patent No.: US 10,712,744 B2
(45) Date of Patent: Jul. 14, 2020

(54) ACTIVE OFF-VEHICLE NOTIFICATION TO AUTONOMOUS-DRIVING VEHICLE

(71) Applicant: Pony AI Inc., Grand Cayman (KY)

(72) Inventors: Hao Song, Sunnyvale, CA (US); Xiang Yu, Santa Clara, CA (US); Tiancheng Lou, Milpitas, CA (US); Jun Peng, Fremont, CA (US); Yiming Liu, San Jose, CA (US); Sinan Xiao, Fremont, CA (US)

(73) Assignee: Pony AI Inc., Grand Cayman (KY)

( * ) Notice: Subject to any disclaimer, the term of this patent is extended or adjusted under 35 U.S.C. 154(b) by 175 days.

(21) Appl. No.: 15/917,438

(22) Filed: Mar. 9, 2018

(65) Prior Publication Data
US 2019/0278275 A1 Sep. 12, 2019

(51) Int. Cl.
| | | |
|---|---|---|
| G05D 1/02 | (2020.01) |
| H04L 29/08 | (2006.01) |
| H04W 68/00 | (2009.01) |
| H04W 4/80 | (2018.01) |
| G08G 1/16 | (2006.01) |
| B60W 30/06 | (2006.01) |

(52) U.S. Cl.
CPC ......... G05D 1/0214 (2013.01); G05D 1/0246 (2013.01); G05D 1/0255 (2013.01); G05D 1/0276 (2013.01); G08G 1/165 (2013.01); G08G 1/166 (2013.01); H04L 67/12 (2013.01); H04W 4/80 (2018.02); H04W 68/005 (2013.01); B60W 30/06 (2013.01); G05D 2201/0213 (2013.01)

(58) Field of Classification Search
CPC .. G05D 1/0214; G05D 1/0255; G05D 1/0276; H04W 4/80; H04W 68/005; G08G 1/165; G08G 1/166; H04L 67/12
USPC .......................................................... 701/26
See application file for complete search history.

(56) References Cited

U.S. PATENT DOCUMENTS

| | | | | |
|---|---|---|---|---|
| 5,002,145 A | * | 3/1991 | Wakaumi | .................. B62D 1/28 180/168 |
| 9,523,984 B1 | * | 12/2016 | Herbach | ............... B62D 15/025 |
| 9,913,240 B2 | | 3/2018 | Skaaksrud | |
| 10,023,117 B2 | | 7/2018 | Ricci | |
| 2004/0236470 A1 | * | 11/2004 | Dooley | ................ G05D 1/0022 700/255 |
| 2013/0093887 A1 | * | 4/2013 | Wu | ..................... G06K 9/00805 348/148 |

(Continued)

FOREIGN PATENT DOCUMENTS

WO WO2006128991 * 12/2006

*Primary Examiner* — Muhammad Shafi
(74) *Attorney, Agent, or Firm* — Sheppard Mullin Richter & Hampton LLP

(57) ABSTRACT

A system included and a computer-implemented method performed in an autonomous-driving vehicle are described. The system performs: detecting a wireless push signal transmitted from a signal transmitter accompanied by an off-vehicle passer and received by a signal receiver of the autonomous-driving vehicle, the wireless push signal including information about a motion capability level of the off-vehicle passer, determining a position and a motion capability level of the off-vehicle passer at least based on the wireless push signal, and controlling a locomotive mechanism of the autonomous-driving vehicle based on the determined position and motion capability level of the off-vehicle passer.

20 Claims, 8 Drawing Sheets

(56) References Cited

U.S. PATENT DOCUMENTS

2016/0224027 A1* 8/2016 Yamamoto ............ B60W 30/09
2017/0254654 A1* 9/2017 Nordbruch ....... G08G 1/096844

* cited by examiner

ACTIVE OFF-VEHICLE NOTIFICATION TO AUTONOMOUS-DRIVING VEHICLE

BACKGROUND

Autonomous-driving vehicles such as vehicles that autonomously operate with limited human inputs or without human inputs are expected in various fields. Autonomous driving of such an autonomous-driving vehicle may involve detection of objects, such as pedestrians and traffic signals, around the autonomous-driving vehicle and determination of behaviors of the autonomous-driving vehicle so as to avoid traffic incident involving the objects. For that reason, it is highly important that an autonomous-driving vehicle accurately detects objects therearound and recognize positions of the detected objects for save driving.

These and other issues are addressed, resolved, and/or reduced using techniques described herein. The foregoing examples of the related art and limitations related therewith are intended to be illustrative and not exclusive. Other limitations of the related art will become apparent to those of skill in the relevant art upon a reading of the specification and a study of the drawings.

SUMMARY

Described herein are a system included in and a computer-implemented method performed in an autonomous-driving vehicle. The system includes one or more processors; and a memory storing instructions that, when executed by the one or more processors.

In one embodiment, the disclosure describes a system that performs: A system included and a computer-implemented method performed in an autonomous-driving vehicle are described. The system performs: detecting a wireless push signal transmitted from a signal transmitter accompanied by an off-vehicle passer and received by a signal receiver of the autonomous-driving vehicle, the wireless push signal including information about a motion capability level of the off-vehicle passer, determining a position and a motion capability level of the off-vehicle passer at least based on the wireless push signal, and controlling a locomotive mechanism of the autonomous-driving vehicle based on the determined position and motion capability level of the off-vehicle passer.

In some embodiments, the system is caused to further obtain image data of surrounding images of the autonomous-driving vehicle generated by one or more image sensors, wherein the position of the off-vehicle passer is determined also based on the obtained image data. In some embodiments, the system is caused to further obtain image data of surrounding images of the autonomous-driving vehicle generated by one or more image sensors, wherein the motion capability level of the off-vehicle passer is determined also based on the obtained image data. In some embodiments, the wireless push signal is transmitted from the signal transmitter accompanied by the off-vehicle passer upon detection of the autonomous-driving vehicle.

In some embodiments, the system is caused to further detect a second wireless push signal transmitted from a signal transmitter accompanied by a stationary object and received by the signal receiver of the autonomous-driving vehicle, the second wireless push signal including information about a location of the stationary object, and determine a position of the stationary object at least based on the second wireless push signal, wherein the locomotive mechanism of the autonomous-driving vehicle is controlled also based on the determined position of the stationary object.

In some embodiments, the system is caused to further obtain image data of surrounding images of the autonomous-driving vehicle generated by one or more image sensors, wherein the position of the stationary object is determined also based on the obtained image data. In some embodiments, the wireless push signal is transmitted from the signal transmitter accompanied by the off-vehicle passer upon detection of the second wireless push signal. In some embodiments, the stationary object is a roadside traffic object including at least one of a traffic signal, a traffic sign, a street lump, a street camera.

In some embodiments, the system is caused to further cause a wireless vehicle signal to be transmitted in response to the wireless push notification signal. In some embodiments, the wireless vehicle signal includes information indicating a route of the autonomous-driving vehicle that the autonomous-driving vehicle is going to take.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

DETAILED DESCRIPTION

Figure 1:
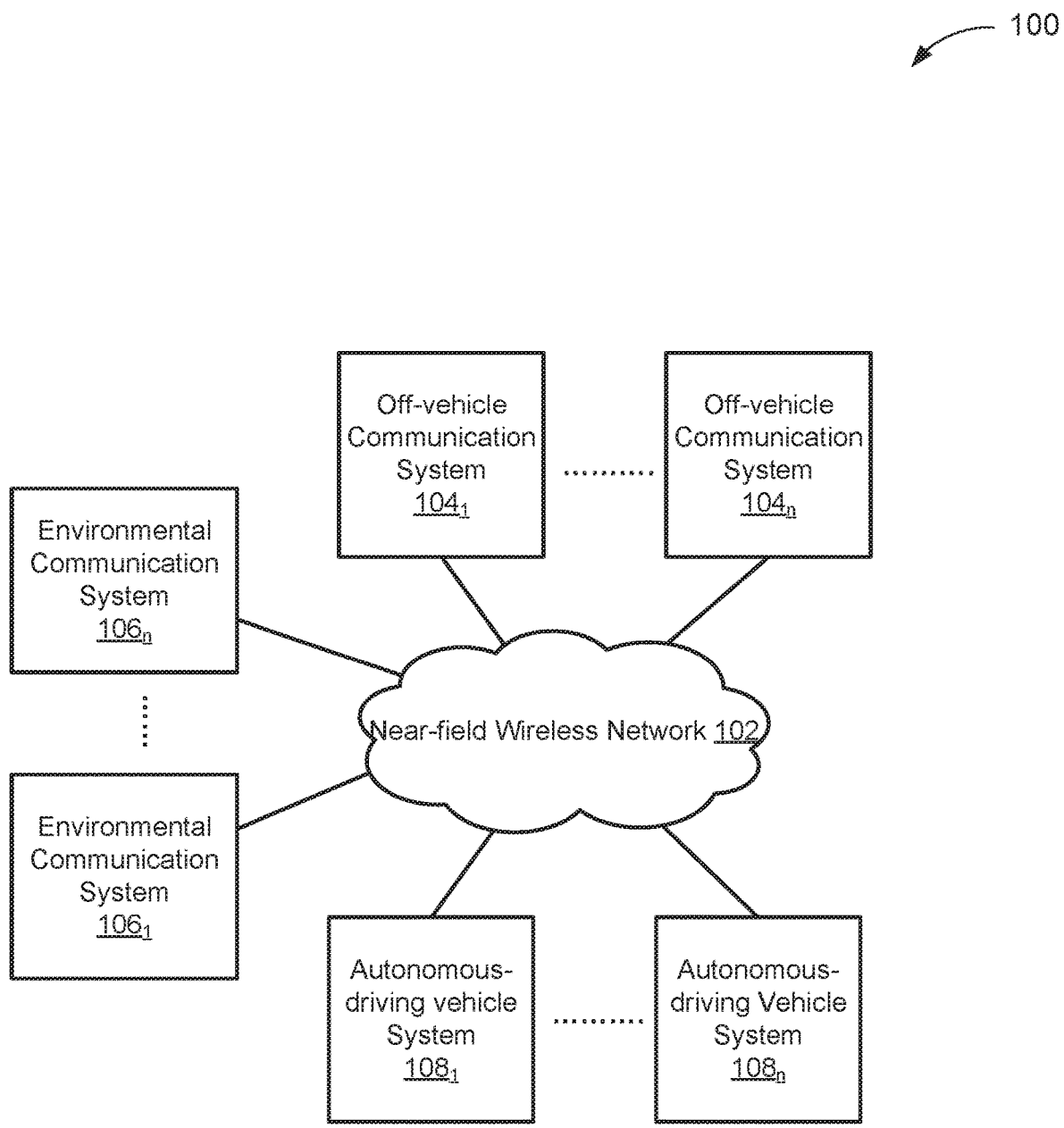
FIG. 1 is a schematic diagram depicting an example of a traffic communication system according to an embodiment.

In the following description, certain specific details are set forth in order to provide a thorough understanding of various embodiments of the invention. However, one skilled in the art will understand that the invention may be practiced without these details. Moreover, while various embodiments of the invention are disclosed herein, many adaptations and modifications may be made within the scope of the invention in accordance with the common general knowledge of those skilled in this art. Such modifications include the substitution of known equivalents for any aspect of the invention in order to achieve the same result in substantially the same way.

Unless the context requires otherwise, throughout the present specification and claims, the word "comprise" and variations thereof, such as, "comprises" and "comprising" are to be construed in an open, inclusive sense, that is as "including, but not limited to." Recitation of numeric ranges of values throughout the specification is intended to serve as a shorthand notation of referring individually to each separate value falling within the range inclusive of the values defining the range, and each separate value is incorporated in the specification as it were individually recited herein. Additionally, the singular forms "a," "an" and "the" include plural referents unless the context clearly dictates otherwise.

Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment, but may be in some instances. Furthermore, the particular features, structures, or characteristics may be combined in any suitable manner in one or more embodiments.

Various embodiments described herein are directed to a system included in an autonomous-driving vehicle (or simply autonomous vehicle) and a computer-implemented method performed in an autonomous-driving vehicle. In a specific implementation, the system and/or the computer-implemented method are intended to provide wireless push notification signals from objects, in particular, human objects such as pedestrians, around an autonomous-driving vehicle towards the autonomous-driving vehicle, such that the autonomous-driving vehicle can detect the objects and properly avoid traffic incidents involving the objects. The technology in certain implementations of the present disclosure involves notifications about objects around an autonomous-driving vehicle in a more active manner, as opposed to conventional passive sensing of objects by an autonomous-driving vehicle.

One embodiment provides systems and methods for receiving active notifications from surrounding road users (e.g., pedestrians and cyclists, can be in opposite direction or in the same direction). The system can automatically choose an appropriate behavior of autonomous-driving based on the active notifications. For instance, one method entails a signal transmitter embodied in a small object accompanied by a road user (e.g., off-vehicle passer) transmitting a wireless push notification signal towards an autonomous-driving vehicle. The wireless push notification signal may indicate a position and/or motion capability of the road user, such that the autonomous-driving vehicle can determine the position and an estimated motion range of the road user and avoid the estimated motion range.

Another embodiment involves interaction of road users and environmental objects such as traffic signals and street lumps, such that road users can more efficiently interact with autonomous-driving vehicles. In a specific implementation, the system and/or the computer-implemented method are intended to transfer wireless push notification signals received from road users at the environmental objects, in order to deliver signals farther. In a specific implementation, the system and/or the computer-implemented method are intended to provide wireless push notification signals from road users upon road users receiving wireless push notification signals from the environmental objects, in order to save energy for transmitting signals.

In a specific implementation, the system performs: detecting a wireless push signal transmitted from a signal transmitter accompanied by an off-vehicle passer and received by a signal receiver of the autonomous-driving vehicle, the wireless push signal including information about a motion capability level of the off-vehicle passer, determining a position and a motion capability level of the off-vehicle passer at least based on the wireless push signal, and controlling a locomotive mechanism of the autonomous-driving vehicle based on the determined position and motion capability level of the off-vehicle passer.

FIG. 1 is a schematic diagram 100 depicting an example of a traffic communication system according to an embodiment. In the example depicted in FIG. 1, the traffic communication system includes a near-field wireless network 102, a plurality of off-vehicle communication systems $104_1$-$104_n$ (hereinafter collectively referred to as off-vehicle communication systems 104), a plurality of environmental communication systems $106_1$-$106_n$ (hereinafter collectively referred to as environmental communication systems 106), and autonomous-driving vehicle systems $108_1$-$108_n$ (hereinafter collectively referred to as autonomous-driving vehicle systems 108).

In the example of FIG. 1, the near-field wireless network 102 is intended to represent a variety of potentially applicable technologies. For example, the near-field wireless network 102 can be used to form a network or part of a network. Where two components are co-located on a device, the near-field wireless network 102 can include data conduit or plane. Depending upon implementation-specific or other considerations, the near-field wireless network 102 can include wireless communication interfaces for communicating over wired or wireless communication channels. Depending upon implementation-specific or other considerations, the near-field wireless network 102 is an ad-hoc wireless network established among one or more of the off-vehicle communication systems 104, one or more of the environmental communication systems 106, and one or more of the autonomous-driving vehicle systems 108. The near-field wireless network 102 can be established using applicable wireless communication protocols, including license-based protocols, such as 3G (e.g., CDMA), 4G (e.g., WiMAX, WiMax2), 5G, and non-license-based protocols, such as IEEE 802.11 (e.g., WiFi), IEEE 802.15.1 (e.g., Bluetooth), IEEE 802.15.4 (e.g., ZigBee), near field communication (NFC), and so on.

In the example of FIG. 1, the off-vehicle communication system 104 is intended to represent a device accompanied by an off-vehicle passer. Depending on a specific implementation and other consideration, an off-vehicle passer may be applicable movable objects, such as a pedestrian, a cyclist, and other people passing on the ground using applicable instruments, such as a wheel chair. Depending on a specific implementation and other consideration, the off-vehicle communication system 104 is embodied in applicable hosts, such as an accessary (e.g., neckless, watch, bracelet, umbrella, etc.), a portable electronic device (e.g., smartphone, tablet, smartwatch, etc.), garments (e.g., jackets, caps, hats, groves, boots, sneakers, etc.), and so on.

In an embodiment, the off-vehicle communication system 104 is configured to store off-vehicle passer data including static information of an off-vehicle passer, such as demographic information and past movement data (e.g., a motion profile). Non-limiting examples of demographic information include age, gender, race, height, weight, hair color, blood type, and physical impairment. In some embodiments, the off-vehicle passer data does not include person-identifiable information such as name, identification number (e.g., SSN), phone number, address, and social profile number, to provide privacy.

A motion profile can be comprised of historic motion data of the passer, such as a position, a moving speed, (e.g., walking speed), a moving pattern (e.g., walking pattern), a position trajectory, and so on. Behavior characteristics, such as likelihood of spontaneous or unpredicted movements (e.g., jumping of a child, fall of an elderly, crossing a street without checking by a distracted pedestrian), may be extracted from such past movement data. The data, whether raw or analyzed, can be used to predict future movements. In some embodiments, the raw motion data are transmitted in a wireless push signal. In some embodiments, the wireless push signal includes extracted data to expedite analysis by an autonomous-driving vehicle system receiving the data. In some embodiments, predicted movements are also included in the wireless push signal.

In an embodiment, the off-vehicle communication system 104 is configured to generate and transmit a wireless push off-vehicle passer notification signal towards environmental communication systems 106 and/or autonomous-driving vehicle systems 108, based on the off-vehicle passer data. In an embodiment, the wireless push off-vehicle passer notification signal includes a position and a motion capability level of the off-vehicle passer, such that the off-vehicle communication system 104 can notify existence and motion capability level of the off-vehicle passer and reduce risk of traffic incidents involving the off-vehicle passer.

In the example of FIG. 1, the environmental communication system 106 is intended to represent a system coupled to environmental objects, such as a traffic signal, a traffic sign, a street lump, and a street camera, and positioned at applicable traffic points, such as a crosswalk, an intersection, a dangerous point that has experienced traffic incidents, and so on. In an embodiment, the environmental communication system 106 is configured to store environmental object data including static information of an environmental object, static information of an environmental object, such as an identification (ID) of object, a type of object, a position of object, and so on. In an embodiment, the environmental communication system 106 is configured to generate and transmit a wireless push environmental notification signal towards environmental communication systems 106 and/or autonomous-driving vehicle systems 108, based on the environmental object data. In an embodiment, the wireless push environmental object notification signal includes a position of the off-vehicle passer, such that the environmental communication system 106 can notify the position of the environmental communication system 106 and reduce risk of traffic incidents involving the environmental object. In an embodiment, the environmental communication system 106 is configured to transfer a wireless push off-vehicle passer signal generated by the off-vehicle communication system 104, when the environmental communication system 106 receives the wireless push off-vehicle passer signal. When a signal transmission range (or power) of the environmental communication system 106 is longer than that of the off-vehicle communication system 104, the wireless push off-vehicle passer signal can be delivered to autonomous-driving vehicle systems 108 at farther locations.

In the example of FIG. 1, the autonomous-driving vehicle system 108 is intended to represent a system primarily mounted on an autonomous-driving vehicle, which is capable of sensing its environment and navigating with a limited human input or without human input. The "vehicle" discussed in this paper typically includes a vehicle that drives on the ground, such as wheeled vehicles, and may also include a vehicle that flies in the sky (e.g., drones, helicopter, airplanes, and so on). The "vehicle" discussed in this paper may or may not accommodate one or more passengers therein.

In one embodiment, the autonomous-driving vehicle includes a vehicle that controls braking and/or acceleration without real time human input. In another embodiment, the autonomous-driving vehicle includes a vehicle that controls steering without real time human input based on inputs from one or more lens mount units. In another embodiment, the autonomous-driving vehicle includes a vehicle that autonomously controls braking, acceleration, and steering without real time human input specifically for parking the vehicle at a specific parking space, such as a parking lot, a curb side of a road (e.g., parallel parking), and a home garage, and so on. Further, "real time human input" is intended to represent a human input that is needed to concurrently control movement of a non-autonomous-driving vehicle, such as gear shifting, steering control, braking pedal control, accel pedal control, crutch pedal control, and so on.

In one embodiment, the autonomous-driving vehicle system 108 is configured to receive wireless push notification signals from the environmental communication system 106 and/or the autonomous-driving vehicle systems 108. In an embodiment, when a wireless push notification signal is received from an off-vehicle communication system 104, the autonomous-driving vehicle system 108 determines a position and/or an estimated motion range of the environmental communication system 106 at least based on the received wireless push notification signal. In an embodiment, when a wireless push notification signal is received from an environmental communication system 106, the autonomous-driving vehicle system 108 determines a position of the environmental communication system 106 at least based on the received wireless push notification signal. In one embodiment, the autonomous-driving vehicle system 108 determines a behavior of an autonomous-driving vehicle mounting the autonomous-driving vehicle system 108 based on positions and/or estimated motion range of surrounding objects.

In one embodiment, the autonomous-driving vehicle system 108 is capable of sensing its environment based on inputs from one or more imaging devices (e.g., camera) mounted on the autonomous-driving vehicle system 108. In an embodiment, the autonomous-driving vehicle system 108 is configured to analyze image data obtained from the one or more imaging devices and identify objects (e.g., traffic signals, road signs, other vehicles, pedestrians, and obstacles) included in images of the analyzed image data. In one embodiment, the autonomous-driving vehicle system 108 is also capable of performing an autonomous-driving operation based on the identified objects. In an embodiment, the autonomous-driving vehicle system 108 is also capable of drive the vehicle so as to follow a traffic stream without hitting the identified objects. For example, the autonomous-driving vehicle system 108 follows traffic signals identified based on image data, follow traffic signs identified based on image data, and drive with a sufficient distance from preceding vehicles.

In the example of FIG. 1, the autonomous-driving vehicle system 108 is also capable of communicating with systems or devices connected to the autonomous-driving vehicle system 108 through a network including the near-field wireless network 102. In an embodiment, the autonomous-driving vehicle system 108 communicates with a server via the network. For example, the autonomous-driving vehicle system 108 pulls up from the server map information (e.g., local map, parking structure map, floor plan of buildings, and etc.) of a region around the autonomous-driving vehicle. In another example, the autonomous-driving vehicle system 108 periodically notifies information of the autonomous-driving vehicle system 108 such as locations and directions thereof to the server.

In an embodiment, the autonomous-driving vehicle system 108 communicates with one or more other autonomous-driving vehicle systems via the network. For example, the autonomous-driving vehicle system 108 sends information of a vehicle route of the corresponding autonomous-driving vehicle to the one or more other autonomous-driving vehicle systems, such that traffic incidents such as collisions can be prevented. In another example, the autonomous-driving vehicle system 108 commands one or more other autonomous-driving police systems to proceed to a particular location so as to avoid traffic incidents.

Figure 2:
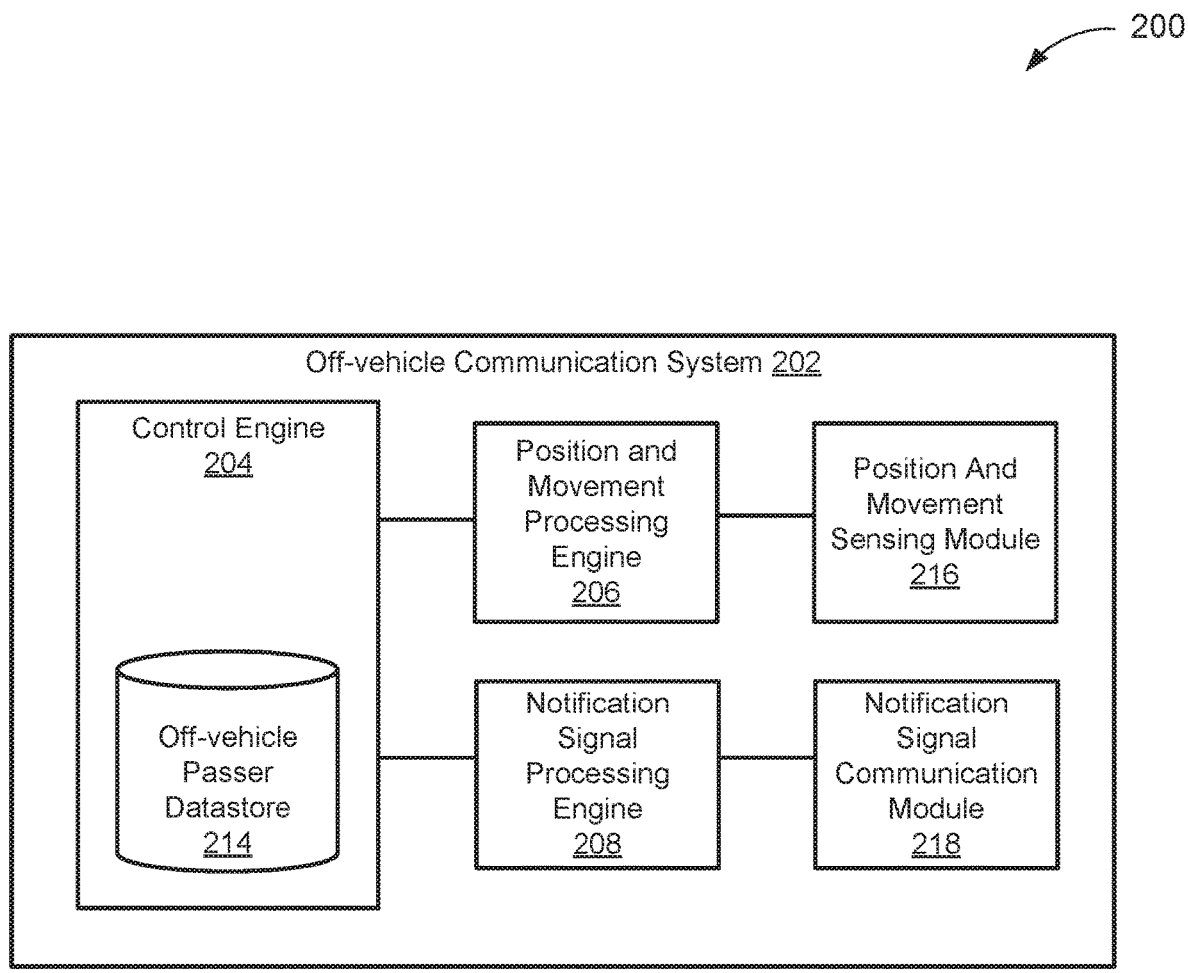
FIG. 2 is a schematic diagram depicting an example of an off-vehicle communication system according to an embodiment.

FIG. 2 is a schematic diagram 200 depicting an example of an off-vehicle communication system according to an embodiment. In the example depicted in FIG. 2, an off-vehicle communication system 202 includes a control engine 204 including an off-vehicle passer datastore 214, a position and movement processing engine 206, and a notification signal processing engine 208. The off-vehicle communication system 202 also includes a position and movement sensing module 216 coupled to the position and movement processing engine 206 and a notification signal communication module 218 coupled to the notification signal processing engine 208.

In the example depicted in FIG. 2, the off-vehicle communication system 202 is intended to represent a system accompanied by an off-vehicle passer. In an embodiment, an off-vehicle passer is a pedestrian, a cyclist, and other people passing on the ground using applicable instruments, such as a wheel chair. In an embodiment, the off-vehicle communication system 202 is embodied in applicable hosts, such as an accessory (e.g., neckless, watch, bracelet, umbrella, etc.), a portable electronic device (e.g., smartphone, tablet, smartwatch, etc.), garments (e.g., jackets, caps, hats, groves, boots, sneakers, etc.), and so on. In an embodiment, the off-vehicle communication system 202 corresponds to the off-vehicle communication system 104 in FIG. 1.

In the example depicted in FIG. 2, the control engine 204 is intended to represent specifically-purposed hardware and software configured to control overall operation of the off-vehicle communication system 202. For example, the control engine 204 controls operations of the notification signal processing engine 206 and the position and movement processing engine 208. In an embodiment, the control engine 204 is configured to store and update off-vehicle passer data in the off-vehicle passer datastore 214. In an embodiment, off-vehicle passer data includes static information of an off-vehicle passer, such as name, age, race, height, weight, hair color, blood type, physical impairment, and so on, static information of an off-vehicle passer system such as identification of the system, time information, and so on. In an embodiment, some of the off-vehicle passer data, such as age, height, weight, physical impairment, and so on, may indicate a motion capability level of the off-vehicle passer. In an embodiment, static information of an off-vehicle passer may be generated by the control engine 204 based on user inputs and/or imported from external datasources.

In the example depicted in FIG. 2, the position and movement processing engine 206 is intended to represent specifically-purposed hardware and software configured to generate off-vehicle passer data. In an embodiment, off-vehicle passer data generated by the position and movement processing engine 206 may include dynamic information of an off-vehicle passer, such as a position, a moving speed, (e.g., walking speed), a moving pattern (e.g., walking pattern), a position trajectory, and so on. In an embodiment, some of the off-vehicle passer data generated by the position and movement processing engine 206, such as a position, a moving speed, (e.g., walking speed), a moving pattern (e.g., walking pattern), a position trajectory, and so on, may indicate a motion capability level of the off-vehicle passer. In an embodiment, when the position and movement processing engine 206 generates the off-vehicle passer data, the control engine 204 updates off-vehicle passer data stored in the off-vehicle passer datastore 214 by overwriting or adding the off-vehicle passer data generated by the position and movement processing engine 206. In an embodiment, the position and movement processing engine 206 generates the off-vehicle passer data based on sensing data obtained from the position and movement sensing module 216.

In the example depicted in FIG. 2, the position and movement sensing module 216 is intended to represent specifically-purposed hardware and software configured to obtain data to determine a position (e.g. global position) and movement of the off-vehicle communication system 202. In a specific implementation, the position and movement sensing module 216 includes a global positioning system (GPS), a gyro sensor, an acceleration sensor, and so on. Depending on a specific implementation and other consideration, the position and movement sensing module 216 may include two or more positioning sensors. In a specific implementation, the movement of the off-vehicle communication system 202 may include a moving speed, (e.g., walking speed), a moving pattern (e.g., walking pattern), a position trajectory, and so on.

In the example depicted in FIG. 2, the notification signal processing engine 208 is intended to represent specifically-purposed hardware and software configured to cause the notification signal communication module 218 to generate a wireless push off-vehicle passer notification signal. In an embodiment, in causing a wireless push off-vehicle passer notification signal to be transmitted, the notification signal processing engine 208 determines timing to transmit the wireless push off-vehicle passer notification signal. In an embodiment, the notification signal processing engine 208 determines to transmit a wireless push off-vehicle passer notification signal upon detection of a trigger event. In an embodiment, a trigger event may include existence of a vehicle around the off-vehicle communication system, which may be detected using applicable detecting modules, such as image sensors, vibration sensors, light sensors, motion sensors, sound sensors, and so on, included in or coupled to the off-vehicle communication system 202. In an embodiment, a trigger event may include detection of a wireless push environmental notification signal transmitted from an environmental communication system (e.g., the environmental communication systems 106 in FIG. 1) and received by the notification signal communication module 218, which may indicate that the off-vehicle communication system is close to a traffic point, such as a crosswalk, an intersection, a dangerous point that has experienced traffic incidents, and so on. Advantageously, the notification signal communication module 218 does not need to transmit all the time, energy for transmitting the wireless push off-vehicle passer notification signal can be saved.

In an embodiment, the notification signal processing engine 208 is configured to generate a wireless push off-vehicle passer notification signal using off-vehicle passer data stored in the off-vehicle passer datastore 214. In an embodiment, a wireless push off-vehicle passer notification signal may indicate a position of the off-vehicle communication system 202, a motion capability level of the corresponding off-vehicle passer, and so on. In an embodiment, a wireless push off-vehicle passer notification signal include only anonymous off-vehicle passer information and may not include personal information, such as name.

In the example depicted in FIG. 2, the notification signal communication module 218 is intended to represent specifically-purposed hardware and software configured to transmit and/or receive wireless notification signals. In an embodiment, the notification signal communication module 218 includes a wireless signal generator circuit and a wireless antenna configured to transmit a wireless signal generated by the wireless signal generator circuit. In an embodiment, the notification signal communication module 218 is configured to transmit a wireless push off-vehicle passer notification signal, when the notification signal processing engine 208 determines to transmit. In an embodiment, the notification signal communication module 218 is configured to receive wireless signals. In an embodiment, the received wireless signals may include wireless vehicle signals returned from an autonomous-driving vehicle in response to a wireless push off-vehicle passer notification signal. In an embodiment, a wireless vehicle signal received from an autonomous-driving vehicle causes the notification signal processing engine 208 to generate an alert notification (e.g., audio and/or visual notification) through a sound generator (e.g. speaker) and/or a screen included in or coupled to the off-vehicle communication system 202. In an embodiment, the received wireless signals may include wireless push environmental notification signal transmitted from an environmental communication system (e.g., the environmental communication systems 106 in FIG. 1).

Figure 3:
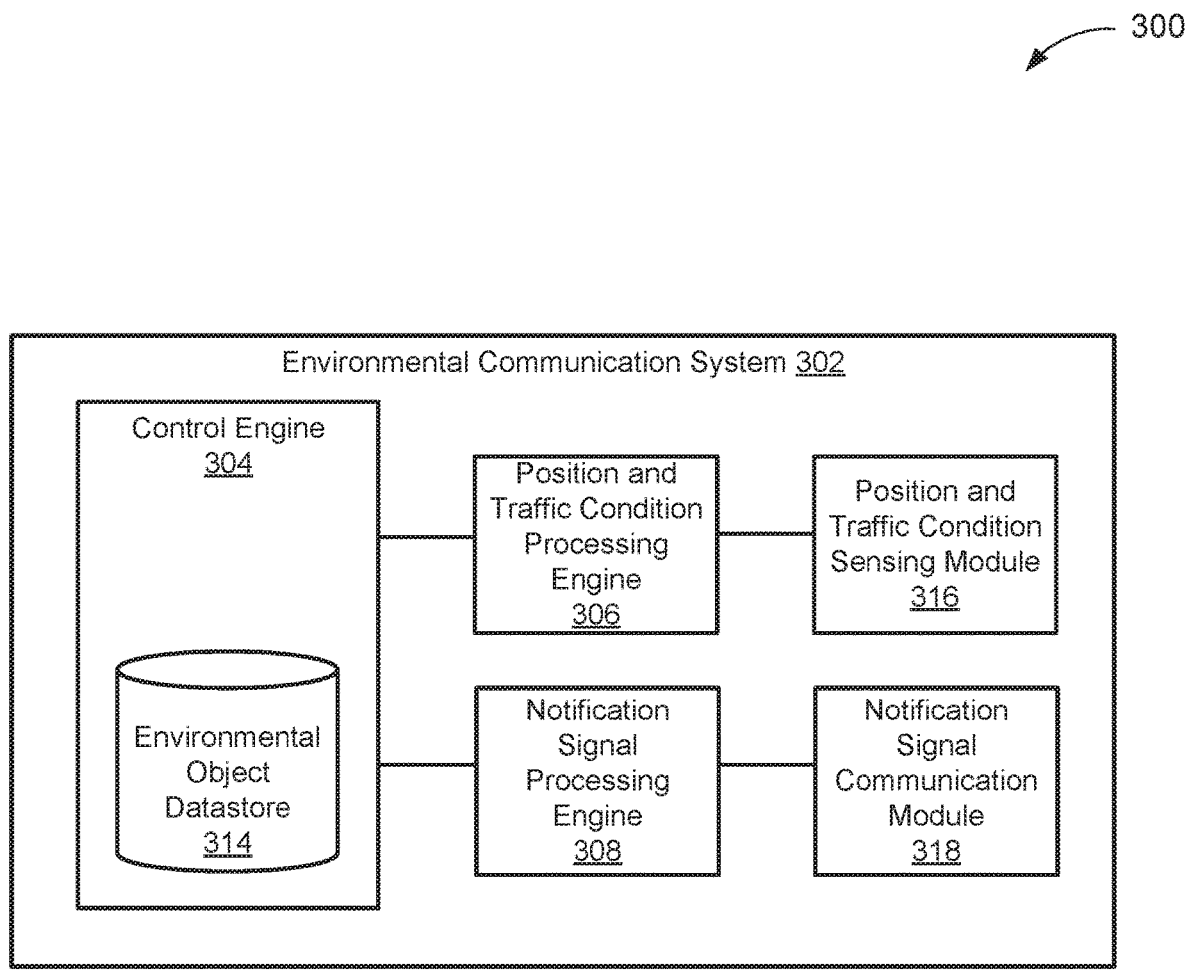
FIG. 3 is a schematic diagram depicting an example of an environmental communication system according to an embodiment.

FIG. 3 is a schematic diagram 300 depicting an example of an environmental communication system according to an embodiment. In the example depicted in FIG. 3, an environmental communication system 302 includes a control engine 304 including an environmental object datastore 314, a position and traffic condition processing engine 306, and a notification signal processing engine 308. The environmental communication system 302 also includes a position and traffic condition sensing module 316 coupled to the position and traffic condition processing engine 306, and a notification signal communication module 318 coupled to the notification signal processing engine 308. In the example depicted in FIG. 3, the environmental communication system 302 is intended to represent a system coupled to environmental objects, such as a traffic signal, a traffic sign, a street lump, and a street camera, and positioned at applicable traffic points, such as a crosswalk, an intersection, a dangerous point that has experienced traffic incidents, and so on. In an embodiment, the environmental communication system 302 corresponds to the environmental communication system 106 in FIG. 1.

In the example depicted in FIG. 3, the control engine 304 is intended to represent specifically-purposed hardware and software configured to control overall operation of the environmental communication system 302. For example, the control engine 304 controls operations of the position and traffic condition processing engine 306 and the notification signal processing engine 308. In another example, the control engine 304 control operation of an environmental object (e.g., traffic signal) to which the environmental communication system 302 is coupled. In an embodiment, the control engine 304 is configured to store and update environmental object data in the environmental object datastore 314. In an embodiment, environmental object data includes static information of an environmental object, such as an identification (ID) of object, a type of object, a position of object, and so on, time information, and so on. In an embodiment, static information of an environmental object may be generated by the control engine 304 based on user inputs and/or imported from external datasources.

In the example depicted in FIG. 3, the position and traffic condition processing engine 306 is intended to represent specifically-purposed hardware and software configured to generate environmental object data. In an embodiment, environmental object data generated by the position and traffic condition processing engine 306 may include dynamic information of an environmental object, such as a vehicle traffic amount, a pedestrian traffic amount, number of past traffic incidents, and so on. In an embodiment, when the position and traffic condition processing engine 306 generates the environmental object data, the control engine 304 updates environmental object data stored in the environmental object data datastore 314 by overwriting or adding the environmental object data generated by the position and traffic condition processing engine 306. In an embodiment, the position and traffic condition processing engine 306 generates the environmental object data based on sensing data obtained from the position and traffic condition sensing module 316.

In the example depicted in FIG. 3, the position and traffic condition sensing module 316 is intended to represent specifically-purposed hardware and software configured to obtain data to determine a position (e.g. global position) of and traffic condition around the environmental communication system 302. In a specific implementation, the position and traffic condition sensing module 316 includes a global positioning system (GPS), an image sensor, a motion sensor, a light sensor, a sound sensor, a vibration sensor, and so on. Depending on a specific implementation and other consideration, the position and traffic condition sensing module 316 may include two or more sensors. In a specific implementation, the traffic condition around the environmental communication system 302 may include a vehicle traffic amount, a pedestrian traffic amount, number of past traffic incidents, and so on.

In the example depicted in FIG. 3, the notification signal processing engine 308 is intended to represent specifically-purposed hardware and software configured to cause the notification signal communication module 318 to generate a wireless push off-vehicle passer notification signal. In an embodiment, in causing a wireless push environmental notification signal to be transmitted, the notification signal processing engine 308 determines timing to transmit the wireless push environmental notification signal. In an embodiment, the notification signal processing engine 308 determines to transmit a wireless push environmental notification signal upon detection of a trigger event. In an embodiment, a trigger event may include existence of an off-vehicle passer and/or a vehicle around the environmental communication system 302, which may be detected by the position and traffic condition sensing module 316. In an embodiment, trigger events may include detection of wireless push off-vehicle passer notification signals transmitted from off-vehicle communication systems (e.g., off-vehicle communication systems 202 in FIG. 2), which may indicate that the off-vehicle communication system is approaching the environmental communication system 302, and received by the notification signal communication module 318. In an embodiment, trigger events may include specific preset time in a day (e.g., 6 AM), for example, when traffic congestion is assumed to start.

In an embodiment, the notification signal processing engine 308 is configured to generate a wireless push environmental notification signal using environmental object data stored in the environmental object datastore 314. In an embodiment, a wireless push environmental object notification signal may indicate a position of the environmental communication system 302, a motion capability level of the corresponding off-vehicle passer, and so on. In an embodiment, a wireless push environmental notification signal include a wireless push off-vehicle passer notification signal received by the notification signal communication module 318. When a signal transmission power of the notification signal communication module 318 is stronger than that of a notification signal communication module of an off-vehicle communication system (e.g., the off-vehicle communication system 202), the notification signal communication module 318 can forwards the wireless push off-vehicle passer notification signal to a longer distance.

In the example depicted in FIG. 3, the notification signal communication module 318 is intended to represent specifically-purposed hardware and software configured to transmit and/or receive wireless notification signals. In an embodiment, the notification signal communication module 318 includes a wireless signal generator circuit and a wireless antenna configured to transmit a wireless signal generated by the wireless signal generator circuit. In an embodiment, the notification signal communication module 318 is configured to transmit a wireless push environmental passer notification signal, when the notification signal processing engine 308 determines to transmit. In an embodiment, the notification signal communication module 318 is configured to receive wireless signals. In an embodiment, the received wireless signals may include wireless vehicle signals returned from an autonomous-driving vehicle in response to a wireless push environmental notification signal. In an embodiment, the received wireless signals may include wireless push off-vehicle notification signals transmitted from an off-vehicle communication system (e.g., the off-vehicle communication systems 202 in FIG. 2). In an embodiment, a received wireless push off-vehicle notification signal may cause transfer thereof from the notification signal communication module 318, and/or operation of an environmental object (e.g., traffic signals, street lumps, etc.). For example, upon reception of a wireless push off-vehicle notification signal, a traffic signal for a pedestrian may be turned green.

Figure 4:
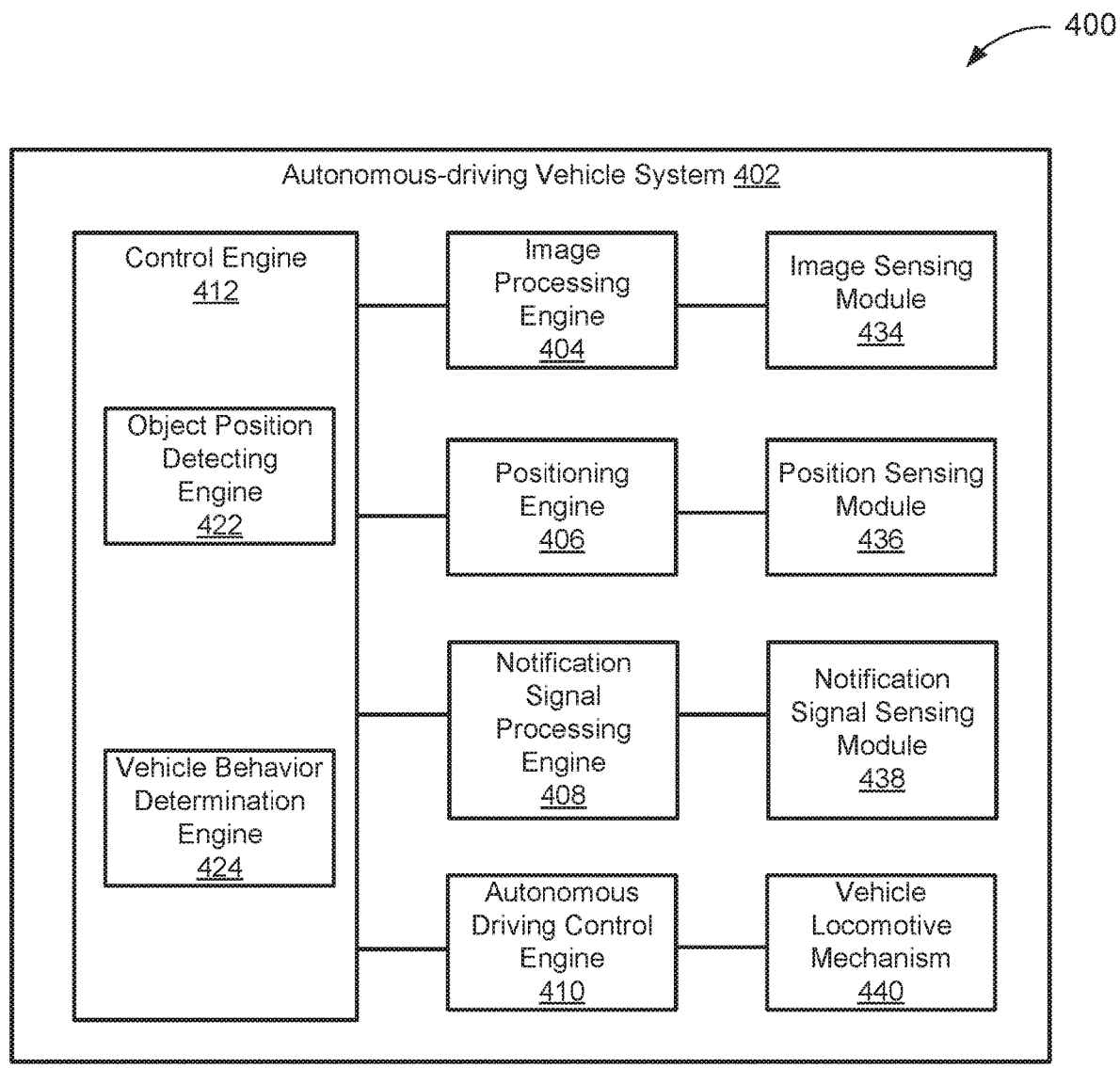
FIG. 4 is a schematic diagram depicting an example of an autonomous-driving vehicle system according to an embodiment.

FIG. 4 is a schematic diagram 400 depicting an example of an autonomous-driving vehicle system according to an embodiment. In the example depicted in FIG. 4, an autonomous-driving vehicle system 402 includes a control engine 412, and an image processing engine 404, a positioning engine 106, a notification signal processing engine 408, and an autonomous-driving control engine 410 coupled to the control engine 412. The autonomous-driving vehicle system 402 also includes an image sensing module 434 coupled to the image processing engine 404, a position sensing module 436 coupled to the positioning engine 406, a notification signal communication module 438 coupled to the notification signal processing engine 408, and a vehicle locomotive mechanism 440 coupled to the autonomous driving control engine 410. In an embodiment, the autonomous-driving vehicle system 402 corresponds to the autonomous-driving vehicle system 108 in FIG. 1.

In the example depicted in FIG. 4, the control engine 412 is intended to represent specifically-purposed hardware and software configured to control overall operation of the autonomous-driving vehicle system 402. For example, the control engine 412 controls operations of the image processing engine 404, the positioning engine 406, the notification signal processing engine 408, and the autonomous driving control engine 410 coupled to the control engine 412. The control engine 412 includes an object position determining engine 422 and a vehicle behavior determination engine 424.

In the example depicted in FIG. 4, the image processing engine 404 is intended to represent specifically-purposed hardware and software configured to carry out image processing of image data of scene images generated by the imaging sensing module 434. In a specific example, the scene images include road signs, traffic signals, lane lines, other vehicles, pedestrians, buildings, and so on. In an embodiment, the image processing engine 404 is configured to detect objects included in each of the scene images. In a specific example, the image processing engine 404 detects objects based on a contour line (high contrast region) included in the scene images.

In the example depicted in FIG. 4, the imaging sensing module 434 is intended to represent specifically-purposed hardware and software configured to capture scene images and generate image data thereof. In a specific implementation, the imaging sensing module 134 includes an image sensor, such as CCD and CMOS sensors, an infrared image sensor, and so on. Depending on a specific implementation and other consideration, the imaging sensing module 434 may include two or more image sensors, and may be or may not be mounted on an autonomous-driving vehicle corresponding to the autonomous-driving vehicle system 402. For example, the imaging sensing module 434 may include one or more images sensors mounted on the autonomous-driving vehicle and one or more images sensors that are not mounted on the autonomous-driving vehicle, and rather placed at external places, such as street lamps, traffic signals, other vehicles, buildings, and so on.

In an embodiment, the image processing engine 404 is configured to identify each object included in the scene images based on image processing of the image data thereof, in accordance with an image recognition technique. For example, according to an image recognition technique, the image processing engine 404 compares image data of each of the detected objects with image data of reference objects that are stored in advance, for example, in the autonomous-driving vehicle system 402 or at an external server for identification of the detected objects. For the image recognition, an applicable machine learning technology (including deep learning) is employed in a specific implementation.

In an embodiment, the image processing engine 404 is configured to generate processed image data and provide the processed image data to the control engine 412. For example, the processed image data include the image data obtained from the imaging devices and metadata of identified objects and metadata of detected objects (but not identified). In a more specific example, the metadata include a relative position (including distance) of each detected object from the autonomous-driving vehicle system 402. In another more specific example, the metadata include a model, make, year, and color of each vehicle included in a scene image, a license plate number of each vehicle included in a scene image, a height, predicted gender, predicted age, and clothes of each pedestrian included in a scene image. In another more specific example, the metadata may also include the number of passengers in one or more vehicles included in the scene image.

In the example depicted in FIG. 4, the positioning engine 406 is intended to represent specifically-purposed hardware and software configured to determine absolute position and orientation of the autonomous-driving vehicle system 402 itself and the detected objects. In an embodiment, the positioning engine 406 determines absolute position and orientation of the autonomous-driving vehicle system 402 based on an inputs from the position sensing module 436. In an embodiment, the positioning engine 406 determines absolute position and orientation of one or more detected objects based on the input from the position sensing module 436 and the relative position obtained based on the image processing.

In the example depicted in FIG. 4, the position sensing module 436 intended to represent specifically-purposed hardware and software configured to obtain data to determine a position (e.g. global position) of the autonomous-driving vehicle system 402. In a specific implementation, the position sensing module 436 includes a global positioning system (GPS), a gyro sensor, an acceleration sensor, and so on. Depending on a specific implementation and other consideration, the position sensing module 436 may include two or more positioning sensors, and may be or may not be mounted on an autonomous-driving vehicle corresponding to the autonomous-driving vehicle system 402. For example, the position sensing module 436 may include one or more positioning sensors mounted on the autonomous-driving vehicle and one or more positioning sensors that are not mounted on the autonomous-driving vehicle, and rather placed at external places, such as street lamps, traffic signals, other vehicles, buildings, and so on.

In the example depicted in FIG. 4, the notification signal processing engine 408 is intended to represent specifically-purposed hardware and software configured to process wireless push notification signals received by the notification signal communication module 438. In an embodiment, wireless push notification signals received by the notification signal communication module 438 may include wireless push off-vehicle passer notification signals generated by off-vehicle communication systems (e.g., the off-vehicle communication system 202 in FIG. 2) and/or wireless push environmental notification signals generated by environmental communication systems (e.g., the environmental communication system 302 in FIG. 3). For example, in processing a wireless push off-vehicle passer notification signal, the notification signal processing engine 408 determines a position of an off-vehicle communication system based on a position thereof included in the wireless push off-vehicle passer notification signal, and determines a motion capability level of an off-vehicle passer associated with the off-vehicle communication system based on a motion capability level included in the wireless push off-vehicle passer notification signal. In another example, in processing a wireless environmental notification signal, the notification signal processing engine 408 determines a position of an environmental object based on a position thereof included in the wireless push environmental notification signal.

In an embodiment, the notification signal processing engine 408 is configured to generate a wireless vehicle signal in response to a wireless push notification signal, and cause the notification signal communication module 438 to transmit the generated wireless vehicle signal. In an embodiment, a wireless vehicle signal may indicate attribute information of an autonomous-driving vehicle corresponding to the autonomous-driving system 402, such as make, model, year, color, etc. In an embodiment, a wireless vehicle signal may indicate a route that an autonomous-driving vehicle corresponding to the autonomous-driving system 402 is going to take.

In the example depicted in FIG. 4, the notification signal communication module 438 is intended to represent specifically-purposed hardware and software configured to transmit and/or receive wireless notification signals. In an embodiment, the notification signal communication module 438 includes a wireless signal generator circuit and a wireless antenna configured to transmit a wireless signal generated by the wireless signal generator circuit. In an embodiment, the notification signal communication module 438 is configured to receive a wireless push off-vehicle passer notification signal from an off-vehicle communication system (e.g., the off-vehicle communication system 202 in FIG. 2) and/or wireless push environmental notification signals generated by environmental communication systems (e.g., the environmental communication system 302 in FIG. 3). In an embodiment, the notification signal communication module 438 is configured to transmit a wireless vehicle signal generated by the notification signal processing engine 408.

In the example depicted in FIG. 4, the object position determining engine 422 is intended to represent specifically-purposed hardware and software configured to determine positions of objects detected and identified by the image processing engine 404 and/or objects (e.g., off-vehicle passers, environmental objects, etc.) notified through wireless push notification signals processed by the notification signal processing engine 408. In an embodiment, image data and/or metadata thereof processed by the image processing engine 404 include a relative position (including distance) of each detected object. In an embodiment, wireless push notification signals processed by the notification signal processing engine 408 include positions of objects from which wireless push notification signals are received, respectively. In an embodiment, the object position determining engine 422 is configured to determine estimated motion ranges of off-vehicle passers based on motion capability levels of the off-vehicle passers obtained from wireless push off-vehicle passer notification signals. For example, an estimated motion range of an off-vehicle passer with a higher motion capability level may be larger than an estimated motion range of an off-vehicle passer with a lower motion capability level.

In the example depicted in FIG. 4, the vehicle behavior determination engine 424 is intended to represent specifically-purposed hardware and software configured to determine behavior of the autonomous-driving vehicle system 402. In an embodiment, the vehicle behavior determination engine 424 autonomously determines behavior of the autonomous-driving vehicle system 402. More specifically, the vehicle behavior determination engine 424 determines a vehicle route (e.g., trajectory) of the autonomous-driving vehicle and scheduled positions of the autonomous-driving vehicle at each point in time along the vehicle route. In an embodiment, the vehicle route includes a global vehicle route including which road to be used and which intersection to make a turn, and so on, and/or a local vehicle route including which lane of a road to be used, which parking spot of a parking place (e.g., curb-side parallel parking space) to be used, and so on.

In an embodiment, the vehicle behavior determination engine 424 determines the vehicle route at least based on positions and/or estimated motion range of objects (e.g., off-vehicle passers, environmental objects, etc.) determined by the object position determining engine 422, such that the autonomous-driving vehicle can safely pass the objects. For example, when a position and an estimated motion range of an off-vehicle passer are determined, the vehicle behavior determination engine 424 determines the vehicle route so as not to pass the estimated motion range of the off-vehicle passer. In an embodiment, the vehicle behavior determination engine 424 determines the vehicle route also based on various other applicable criteria, such as a current location, a destination, traffic conditions (e.g., congestion, speed limits, number of traffic signals, etc.), weather conditions, environmental conditions (e.g., time, brightness, etc.), geographic crime rates, number of intersection turns, existence of obstacles on roads, etc. In an embodiment, the vehicle behavior determination engine 424 subordinately determines behavior of the autonomous-driving vehicle system 402 based on instructions from an external system (e.g., autonomous-driving vehicle systems of other vehicles, a traffic control server, etc.).

In the example depicted in FIG. 4, the autonomous-driving control engine 410 is intended to represent specifically-purposed hardware and software configured to perform an autonomous-driving operation of the autonomous-driving vehicle system 402 based on the determined behavior of the autonomous-driving vehicle system 402. For example, when the vehicle behavior determination engine 424 determines to change a lane on a road, the autonomous-driving control engine 410 causes the vehicle locomotive mechanism 440 to flash blinker lamps, direct wheels to the lane, and return position of the wheels after changing the lame and stop blinker lamps. For example, when the vehicle behavior determination engine 424 determines to proceed to a specific location (e.g., a parking spot), the autonomous-driving control engine 410 causes the vehicle locomotive mechanism 440 to drive to the specific location. For example, when the vehicle behavior determination engine 424 determines to take a specific route, the autonomous-driving control engine 410 causes the vehicle locomotive mechanism 440 to drive taking the specific route.

In the example depicted in FIG. 4, the vehicle locomotive mechanism 440 is intended to represent specifically-purposed mechanism to drive an autonomous-driving vehicle. Depending on a specific implementation and other consideration, the vehicle locomotive mechanism 440 may include an electrical power and drive unit, such as a motor, to drive the autonomous-driving vehicle, and/or a fuel-based power and drive unit such as an engine. Depending on a specific implementation and other consideration, the vehicle locomotive mechanism 440 may be controlled based on mechanical control actions triggered by the autonomous-driving control engine 410 and/or electrical signals generated by the autonomous-driving control engine 410.

Figure 5:
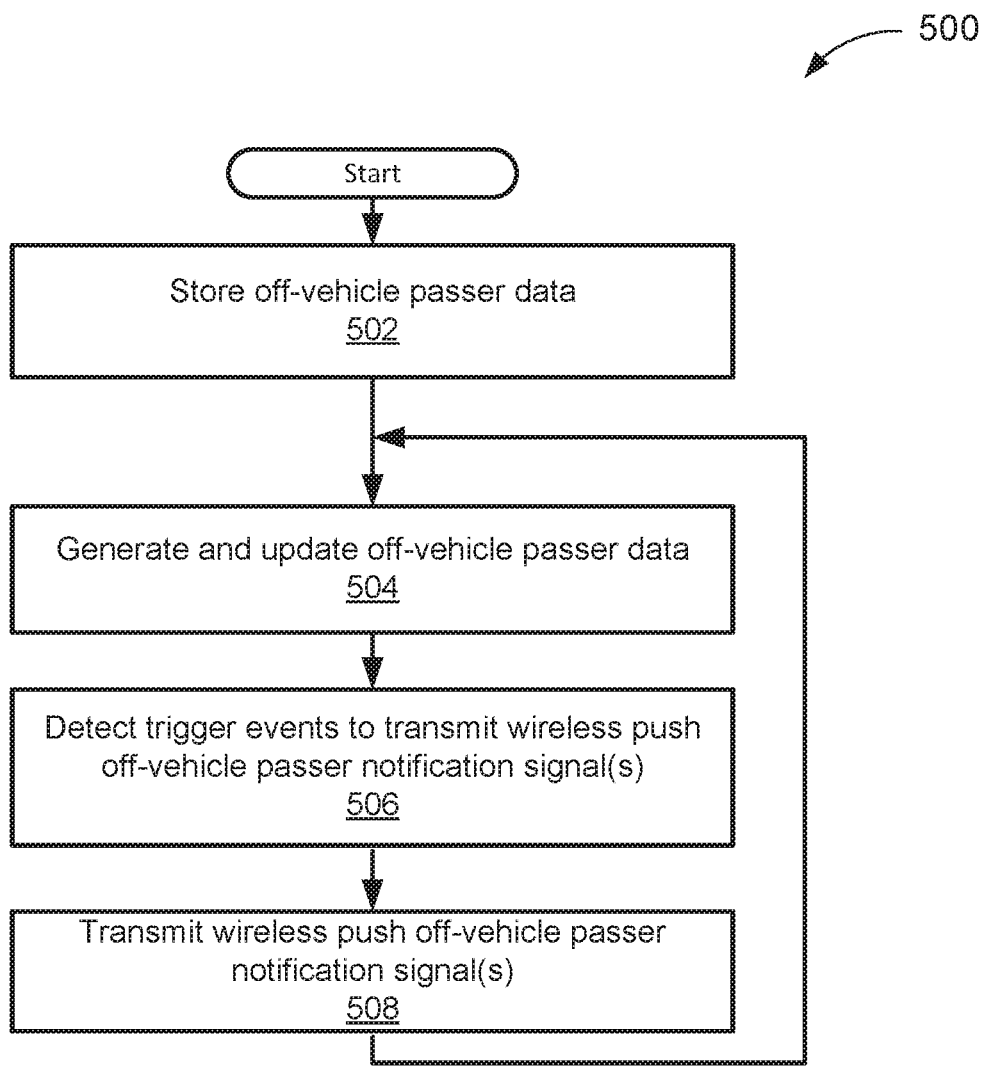
FIG. 5 depicts a flowchart of an example of a method for operating an off-vehicle communication system according to an embodiment.

FIG. 5 depicts a flowchart 500 of an example of a method for operating an off-vehicle communication system according to an embodiment. This flowchart and other flowcharts described in this paper illustrate modules (and potentially decision points) organized in a fashion that is conducive to understanding. It should be recognized, however, that the modules can be reorganized for parallel execution, reordered, modified (changed, removed, or augmented), where circumstances permit. In the example of FIG. 5, the flowchart 500 starts at module 502, with storing off-vehicle passer data. An applicable engine for storing off-vehicle passer data, such as a control engine of an off-vehicle communication system (e.g., the control engine 204 in FIG. 2) described in this paper, stores the off-vehicle passer data in applicable datastore, such as off-vehicle passer datastore (e.g., the off-vehicle passer datastore 214 in FIG. 2) described in this paper. In an embodiment, off-vehicle passer data stored in module 502 includes static information of an off-vehicle passer, such as name, age, race, height, weight, hair color, blood type, physical impairment, and so on, static information of an off-vehicle passer system such as identification of the system, time information, and so on. In an embodiment, some of the off-vehicle passer data stored in module 502, such as age, height, weight, physical impairment, and so on, may indicate a motion capability level of the off-vehicle passer.

In the example of FIG. 5, the flowchart 500 continues to module 504, with generating off-vehicle passer data and updating stored off-vehicle passer data. An applicable engine for generating off-vehicle passer data, such as a position and movement processing engine (e.g. the position and movement processing engine 206 in FIG. 2) described in this paper, generates the off-vehicle passer data, and an applicable engine for updating stored off-vehicle passer data, such as a control engine of an off-vehicle communication system (e.g., the control engine 204 in FIG. 2) described in this paper, updates stored off-vehicle passer data. In an embodiment, off-vehicle passer data generated and updated in module 504 includes dynamic information of an off-vehicle passer, such as a position, a moving speed, (e.g., walking speed), a moving pattern (e.g., walking pattern), a position trajectory, and so on. In an embodiment, some of the off-vehicle passer data stored in module 504, such as a position, a moving speed, (e.g., walking speed), a moving pattern (e.g., walking pattern), a position trajectory, and so on, may indicate a motion capability level of the off-vehicle passer.

In the example of FIG. 5, the flowchart 500 continues to module 506, with detecting trigger events to transmit wireless push off-vehicle passer notification signal(s). An applicable engine for detecting trigger events, such as a control engine of an off-vehicle communication system (e.g., the control engine 204 in FIG. 2) described in this paper, detects trigger events to transmit wireless push off-vehicle passer notification signal(s). In an embodiment, trigger events may include existence of a vehicle around the off-vehicle communication system, which may be detected using applicable detecting modules, such as image sensors, vibration sensors, light sensors, motion sensors, sound sensors, and so on. In an embodiment, trigger events may include detection of wireless push environmental notification signals transmitted from environmental communication systems (e.g., the environmental communication systems 302 in FIG. 3), which may indicate that the off-vehicle communication system is approaching a traffic point, such as a crosswalk, an intersection, a dangerous point that has experienced traffic incidents, and so on. In an embodiment, trigger events may include user setting (e.g., turn-on of signal transmission function) to transmit the wireless push off-vehicle passer notification signal, which may be carried out when a user goes out.

In the example of FIG. 5, the flowchart 500 continues to module 508, with transmitting wireless push off-vehicle passer notification signal(s). An applicable engine for transmitting wireless push off-vehicle passer notification signal(s), such as a notification signal processing engine (e.g., the notification signal processing engine 208 in FIG. 2) described in this paper, causes an applicable module, such as a notification signal communication module (e.g., the notification signal communication module 218 in FIG. 2) described in this paper, to transmit the wireless push off-vehicle passer notification signal(s). In an embodiment, a wireless push off-vehicle passer notification signal may indicate a position of an off-vehicle communication system, a motion capability level of the corresponding off-vehicle passer, and so on. In an embodiment, a wireless push off-vehicle passer notification signal include only anonymous off-vehicle passer information and may not include personal information, such as name. In the example of FIG. 5, the flowchart 500 returns to module 504, and module 504 through module 508 are repeated.

Figure 6:
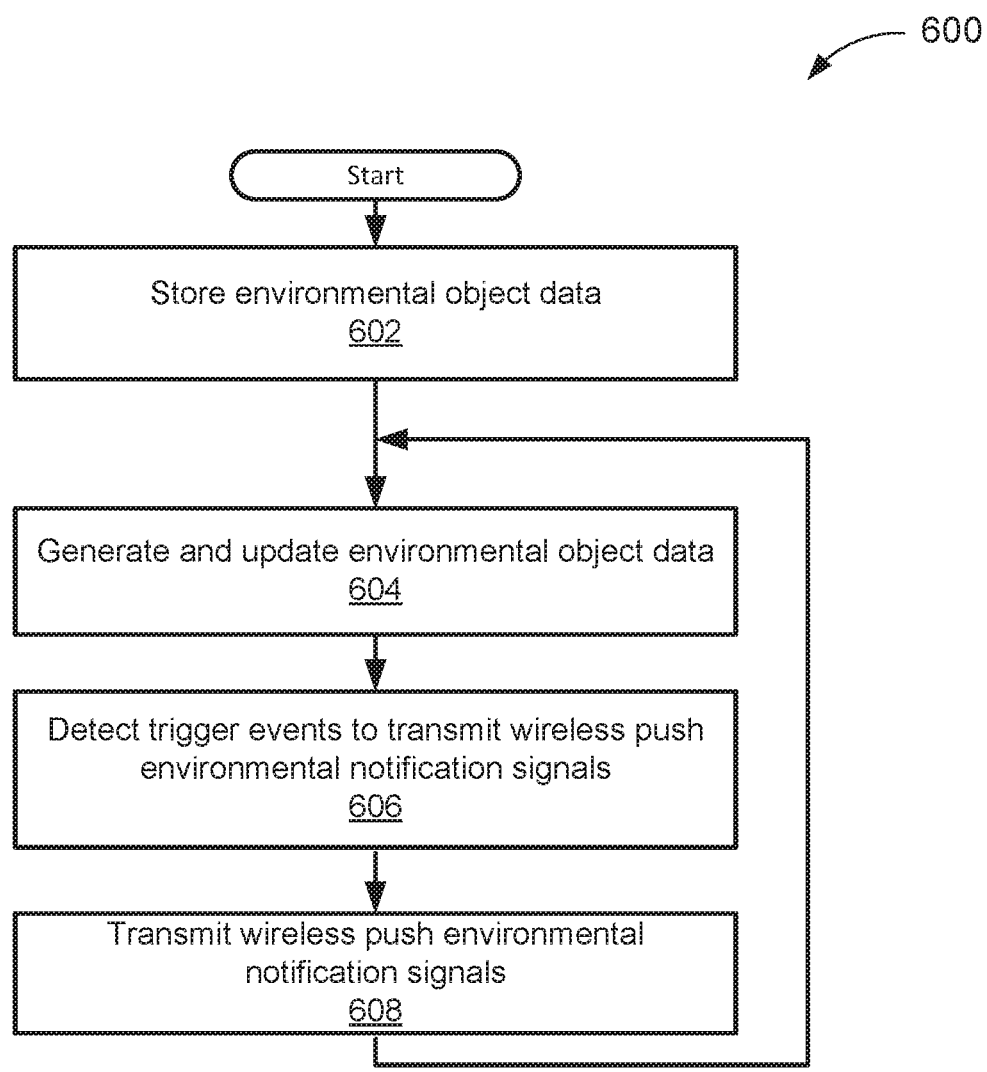
FIG. 6 depicts a flowchart of an example of a method for operating an environmental communication system according to an embodiment.

FIG. 6 depicts a flowchart 600 of an example of a method for operating an environmental communication system according to an embodiment. In the example of FIG. 6, the flowchart 600 starts at module 602, with storing environmental object data. An applicable engine for storing environmental object data, such as a control engine of an environmental communication system (e.g., the control engine 304 in FIG. 3) described in this paper, stores the environmental object data in applicable datastore, such as environmental object datastore (e.g., the environmental object datastore 314 in FIG. 3) described in this paper. In an embodiment, an environmental object includes objects placed around paths of vehicles, such as a traffic signal, a traffic sign, a street lump, and a street camera. In an embodiment, environmental object data stored in module 602 includes static information of an environmental object, such as an identification (ID) of object, a type of object, a position of object, and so on, time information, and so on.

In the example of FIG. 6, the flowchart 600 continues to module 604, with generating environmental object data and updating stored environmental object data. An applicable engine for generating environmental object, such as a traffic condition processing engine (e.g. the position and traffic condition processing engine 306 in FIG. 3) described in this paper, generates the environmental object data, and an applicable engine for updating stored environmental object data, such as a control engine of an environmental communication system (e.g., the control engine 304 in FIG. 3) described in this paper, updates stored environmental object data. In an embodiment, environmental object data generated and updated in module 604 includes dynamic information of an environmental object, such as a vehicle traffic amount, a pedestrian traffic amount, number of past traffic incidents, and so on.

In the example of FIG. 6, the flowchart 600 continues to module 606, with detecting trigger events to transmit wireless push environmental notification signal(s). An applicable engine for detecting trigger events, such as a control engine of an environmental communication system (e.g., the control engine 304 in FIG. 3) described in this paper, detects trigger events to transmit wireless push environmental notification signal(s). In an embodiment, trigger events may include existence of an off-vehicle passer and/or a vehicle around the environmental communication system, which may be detected using applicable detecting modules, such as image sensors, vibration sensors, light sensors, motion sensors, sound sensors, wireless signal receivers, and so on. In an embodiment, trigger events may include detection of wireless push off-vehicle passer notification signals transmitted from off-vehicle communication systems (e.g., off-vehicle communication systems 202 in FIG. 2), which may indicate that the off-vehicle communication system is approaching the environmental communication system at a traffic point, such as a crosswalk, an intersection, a dangerous point that has experienced traffic incidents, and so on. In an embodiment, trigger events may include specific preset time in a day (e.g., 6 AM), for example, when traffic congestion is assumed to start.

In the example of FIG. 6, the flowchart 600 continues to module 608, with transmitting wireless push environmental notification signal(s). An applicable engine for transmitting wireless push environmental notification signal(s), such as a notification signal processing engine (e.g., the notification signal processing engine 308 in FIG. 3) described in this paper, causes an applicable module such as a notification signal communication module (e.g., the notification signal communication module 318 in FIG. 3) to transmit the wireless push environmental notification signal(s). In an embodiment, a wireless push off-vehicle environmental signal may indicate a position of an environmental communication system, existence of an off-vehicle passer, and so on. In the example of FIG. 6, the flowchart 600 returns to module 604, and module 604 through module 608 are repeated.

Figure 7:
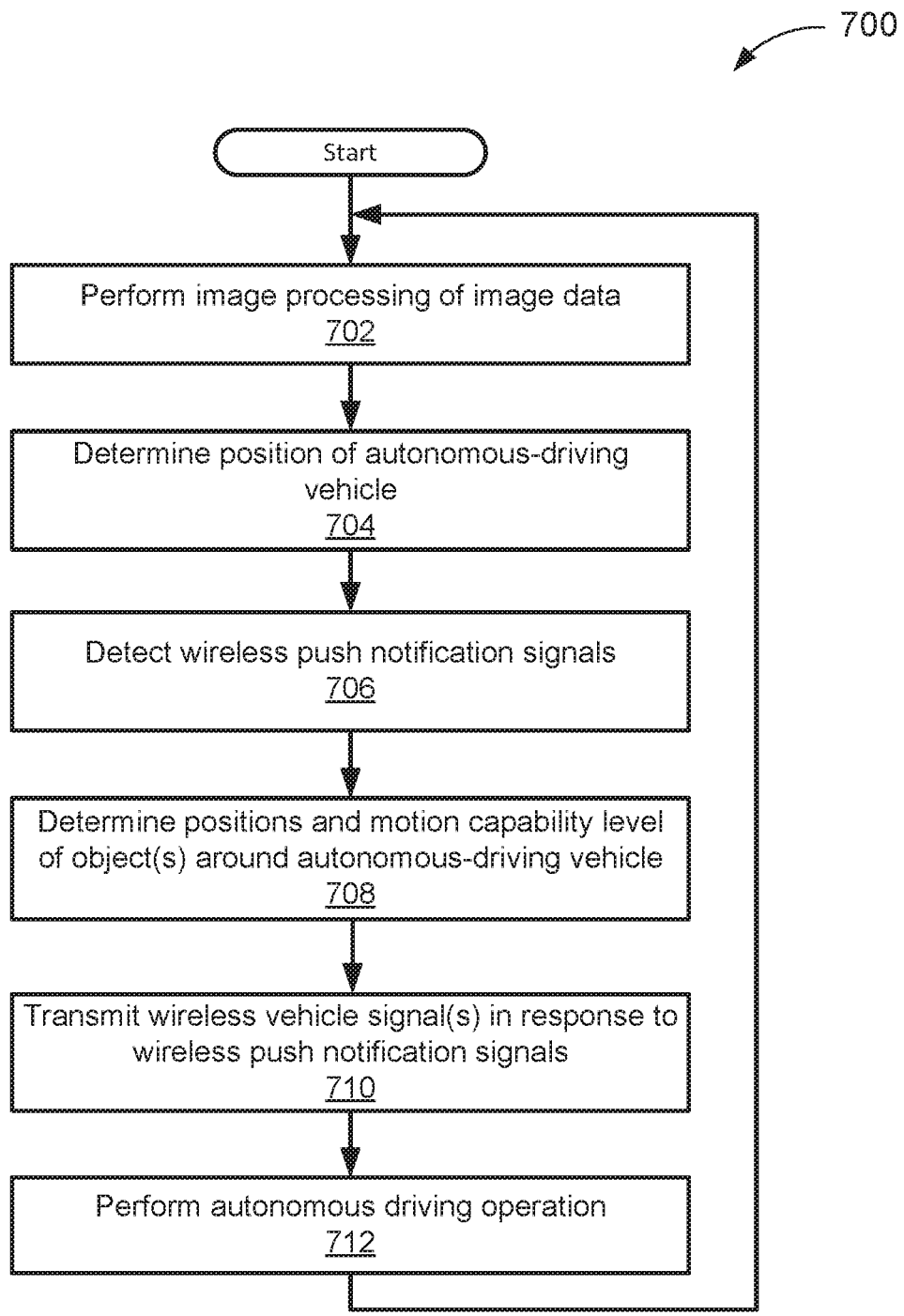
FIG. 7 depicts a flowchart of an example of a method for operating an autonomous-driving vehicle system according to an embodiment.

FIG. 7 depicts a flowchart 700 of an example of a method for operating an autonomous-driving vehicle system. In the example of FIG. 7, the flowchart 700 starts at module 702, with performing image processing of image data. An applicable engine for performing image processing, such as an image processing engine (e.g., the image processing engine 404 in FIG. 4) described in this paper, can perform the image processing. In an embodiment, objects included in scene images captured by imaging devices are detected, the detected objects are then identified according to an image recognition technique, and relative position and orientation of the detected objects from an autonomous-driving vehicle system are determined in the module 702.

In the example of FIG. 7, the flowchart 700 continues at module 704, with determining a position of an autonomous-driving vehicle. An applicable engine for determining a position of an autonomous-driving vehicle, such as a positioning engine (e.g., the positioning engine 406 in FIG. 4) described in this paper, determines the position of the autonomous-driving vehicle based on position data obtained from an applicable module, such as a position sensing module (e.g., the position sensing module in FIG. 4) described in this paper. In a specific implementation, the position data may include global positioning system (GPS) data, an orientation of the autonomous-driving vehicle, a driving speed, an acceleration, and so on.

In the example of FIG. 7, the flowchart 700 continues at module 706, with detecting wireless push notification signal(s). An applicable engine for detecting wireless push notification signals, such as an notification signal processing engine (e.g., the notification signal processing engine 406 in FIG. 4) described in this paper, detects wireless push notification signal(s) received by an applicable module, such as a notification signal sensing module (e.g., the notification signal communication module 438 in FIG. 4) described in this paper. In a specific implementation, wireless push notification signals may include wireless push off-vehicle passer notification signal(s) transmitted from off-vehicle communication systems (e.g., the off-vehicle communication system 202 in FIG. 2) and/or wireless push environmental notification signal(s) transmitted from environmental communication systems (e.g., the environmental communication system 302 in FIG. 3).

In the example of FIG. 7, the flowchart 700 continues to module 708, with determining positions of object(s) and motion capability level(s) of off-vehicle passer(s) around an autonomous-driving vehicle. An applicable engine for determining positions of object(s) such as off-vehicle passer(s) and environmental objects and motion capability level(s) of off-vehicle passer(s) around an autonomous-driving vehicle, such as an object position determining engine (e.g., the object position determining engine 422 in FIG. 4) described in this paper, determines positions of the object(s) and the motion capability level(s) of off-vehicle passer(s), based on received wireless push notification signal(s).

In the example of FIG. 7, the flowchart 700 continues to module 710, with transmitting wireless vehicle signal(s) in response to wireless push notification signal(s). An applicable engine for transmitting wireless vehicle signals, such as a notification signal processing engine (e.g., the notification signal processing engine in FIG. 4) described in this paper, causes an applicable module such as a notification signal communication module (e.g., the notification signal communication module 436 in FIG. 4) to transmit the wireless vehicle signal(s). In a specific implementation, a wireless push notification signal may indicate a route of the autonomous-driving vehicle that the autonomous-driving vehicle is going to take.

In the example of FIG. 7, the flowchart 700 continues to module 712, with performing an autonomous driving operation. An applicable engine for performing an autonomous driving operation, such as an autonomous driving control engine (e.g., the autonomous driving control engine 410 in FIG. 4) described in this paper, can perform the autonomous driving operation by controlling an applicable locomotive mechanism (e.g., the vehicle locomotive mechanism 440 in FIG. 4) of an autonomous-driving vehicle. In an embodiment, in performing an autonomous driving operation, movement of the autonomous-driving vehicle is determined based on position(s) and motion capability level(s) of off-vehicle passer(s), so as to be safe to the off-vehicle passer(s), and a locomotive mechanism (e.g., the locomotive mechanism 440 in FIG. 4) of the autonomous-driving vehicle is controlled based on the predicted movement of the target movable object(s). In the example of FIG. 7, the flowchart 700 returns to module 702, and module 702 through module 712 are repeated.

The foregoing description of the present invention has been provided for the purposes of illustration and description. It is not intended to be exhaustive or to limit the invention to the precise forms disclosed. The breadth and scope of the present invention should not be limited by any of the above-described exemplary embodiments. Many modifications and variations will be apparent to the practitioner skilled in the art. The modifications and variations include any relevant combination of the disclosed features. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows 10, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 8:
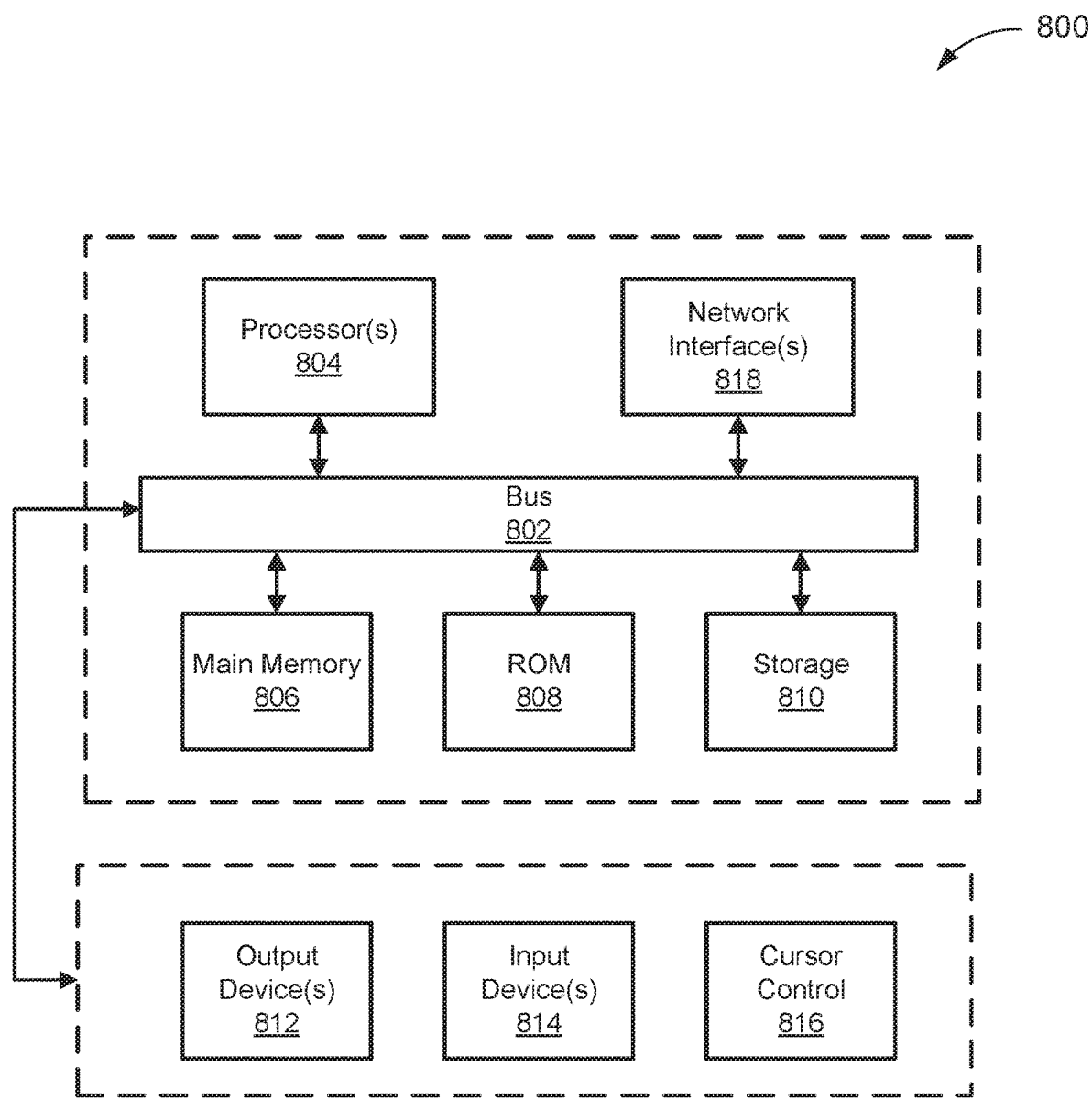
FIG. 8 is a block diagram that illustrates a computer system upon which any of the embodiments described herein may be implemented.

FIG. 8 is a block diagram that illustrates a computer system 800 upon which any of the embodiments described herein may be implemented. The computer system 800 includes a bus 802 or other communication mechanism for communicating information, one or more hardware processors 804 coupled with bus 802 for processing information. Hardware processor(s) 804 may be, for example, one or more general purpose microprocessors.

The computer system 800 also includes a main memory 806, such as a random access memory (RAM), cache and/or other dynamic storage devices, coupled to bus 802 for storing information and instructions to be executed by processor 804. Main memory 806 also may be used for storing temporary variables or other intermediate information during execution of instructions to be executed by processor 804. Such instructions, when stored in storage media accessible to processor 804, render computer system 800 into a special-purpose machine that is customized to perform the operations specified in the instructions.

The computer system 800 further includes a read only memory (ROM) 808 or other static storage device coupled to bus 802 for storing static information and instructions for processor 804. A storage device 810, such as a magnetic disk, optical disk, or USB thumb drive (Flash drive), etc., is provided and coupled to bus 802 for storing information and instructions.

The computer system 800 may be coupled via bus 802 to output device(s) 812, such as a cathode ray tube (CRT) or LCD display (or touch screen), for displaying information to a computer user. Input device(s) 814, including alphanumeric and other keys, are coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 800 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor(s) 804 executing one or more sequences of one or more instructions contained in main memory 806. Such instructions may be read into main memory 806 from another storage medium, such as storage device 810. Execution of the sequences of instructions contained in main memory 806 causes processor(s) 804 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 810. Volatile media includes dynamic memory, such as main memory 806. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may retrieves and executes the instructions. The instructions received by main memory 806 may optionally be stored on storage device 810 either before or after execution by processor 804.

The computer system 800 also includes a communication interface 818 coupled to bus 802. Communication interface 818 provides a two-way data communication coupling to one or more network links that are connected to one or more local networks. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN (or WAN component to communicated with a WAN). Wireless links may also be implemented. In any such implementation, communication interface 818 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 818, which carry the digital data to and from computer system 800, are example forms of transmission media.

The computer system 800 can send messages and receive data, including program code, through the network(s), network link and communication interface 818. In the Internet example, a server might transmit a requested code for an application program through the Internet, the ISP, the local network and the communication interface 818.

The received code may be executed by processor 804 as it is received, and/or stored in storage device 810, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A system for an autonomous-driving vehicle, comprising:
    one or more processors; and
    memory storing instructions that, when executed by the one or more processors, cause the one or more processors to:
    detect a first wireless push signal transmitted from a signal transmitter accompanied by an off-vehicle passer and received by a signal receiver of the autonomous-driving vehicle, the first wireless push signal comprising information about a motion capability level of the off-vehicle passer;
    determine a position and the motion capability level of the off-vehicle passer at least based on the first wireless push signal;
    control a locomotive mechanism of the autonomous-driving vehicle based on the determined position and motion capability level of the off-vehicle passer;
    detect a second wireless push signal transmitted from a signal transmitter accompanied by a stationary object and received by the signal receiver of the autonomous-driving vehicle, the second wireless push signal including information about a location of the stationary object; and
    determine a position of the stationary object at least based on the second wireless push signal, wherein the locomotive mechanism of the autonomous-driving vehicle is controlled also based on the determined position of the stationary object.

2. The system of claim 1, wherein the information in the first wireless push signal further comprises demographic information or a motion profile of the off-vehicle passer.

3. The system of claim 1, wherein the instructions cause the one or more processors to obtain image data of surrounding images of the autonomous-driving vehicle generated by one or more image sensors, wherein the position of the off-vehicle passer is determined also based on the obtained image data.

4. The system of claim 1, wherein the instructions cause the one or more processors to obtain image data of surrounding images of the autonomous-driving vehicle generated by one or more image sensors, wherein the motion capability level of the off-vehicle passer is determined also based on the obtained image data.

5. The system of claim 1, wherein the first wireless push signal is transmitted from the signal transmitter accompanied by the off-vehicle passer upon detection of the autonomous-driving vehicle.

6. The system of claim 1, wherein the instructions cause the one or more processors to obtain image data of surrounding images of the autonomous-driving vehicle generated by one or more image sensors, wherein the position of the stationary object is determined also based on the obtained image data.

7. The system of claim 1, wherein the first wireless push signal is transmitted from the signal transmitter accompanied by the off-vehicle passer upon detection of the second wireless push signal.

8. The system of claim 1, wherein the stationary object is a roadside traffic object including at least one of a traffic signal, a traffic sign, a street lump, and a street camera.

9. The system of claim 1, wherein the instructions cause the one or more processors to cause a wireless vehicle signal to be transmitted in response to the first wireless push signal or the second wireless push signal.

10. The system of claim 9, wherein the at least one of the first wireless vehicle signal or the second wireless push signal includes information indicating a route of the autonomous-driving vehicle that the autonomous-driving vehicle is going to take.

11. A computer-implemented method performed in an autonomous-driving vehicle comprising:
    detecting a first wireless push signal transmitted from a signal transmitter accompanied by an off-vehicle passer and received by a signal receiver of the autonomous-driving vehicle, the first wireless push signal comprising information about a motion capability level of the off-vehicle passer;
    determining a position and the motion capability level of the off-vehicle passer at least based on the first wireless push signal;
    controlling a locomotive mechanism of the autonomous-driving vehicle based on the determined position and motion capability level of the off-vehicle passer;
    detecting a second wireless push signal transmitted from a signal transmitter accompanied by a stationary object and received by the signal receiver of the autonomous-driving vehicle, the second wireless push signal including information about a location of the stationary object; and
    determining a position of the stationary object at least based on the second wireless push signal, wherein the locomotive mechanism of the autonomous-driving vehicle is controlled also based on the determined position of the stationary object.

12. The computer-implemented method of claim 11, wherein the information in the first wireless push signal further comprises demographic information or a motion profile of the off-vehicle passer.

13. The computer-implemented method of claim 11, further comprising obtaining image data of surrounding images of the autonomous-driving vehicle generated by one or more image sensors, wherein the position of the off-vehicle passer is determined also based on the obtained image data.

14. The computer-implemented method of claim 11, further comprising obtaining image data of surrounding images of the autonomous-driving vehicle generated by one or more image sensors, wherein the motion capability level of the off-vehicle passer is determined also based on the obtained image data.

15. The computer-implemented method of claim 11, further comprising transmitting the first wireless push signal from the signal transmitter accompanied by the off-vehicle passer upon detection of the autonomous-driving vehicle.

16. The computer-implemented method of claim 11, further comprising obtaining image data of surrounding images of the autonomous-driving vehicle generated by one or more image sensors, wherein the position of the stationary object is determined also based on the obtained image data.

17. The computer-implemented method of claim 11, wherein the first wireless push signal is transmitted from the signal transmitter accompanied by the off-vehicle passer upon detection of the second wireless push signal.

18. The computer-implemented method of claim 11, wherein the stationary object is a roadside traffic object including at least one of a traffic signal, a traffic sign, a street lump, and a street camera.

19. A non-transitory computer-readable storage medium including instructions that, when executed by one or more processors of a computing system of an autonomous-driving vehicle, cause the computing system to perform a method comprising:

detecting a first wireless push signal transmitted from a signal transmitter accompanied by an off-vehicle passer and received by a signal receiver of the autonomous-driving vehicle, the first wireless push signal comprising information about a motion capability level of the off-vehicle passer;

determining a position and the motion capability level of the off-vehicle passer at least based on the first wireless push signal;

controlling a locomotive mechanism of the autonomous-driving vehicle based on the determined position and motion capability level of the off-vehicle passer;

detecting a second wireless push signal transmitted from a signal transmitter accompanied by a stationary object and received by the signal receiver of the autonomous-driving vehicle, the second wireless push signal including information about a location of the stationary object; and determining a position of the stationary object at least based on the second wireless push signal, wherein the locomotive mechanism of the autonomous-driving vehicle is controlled also based on the determined position of the stationary object.

20. The non-transitory computer-readable storage medium of claim 19, wherein the information in the first wireless push signal further comprises demographic information or a motion profile of the off-vehicle passer.

* * * * *